(12) United States Patent
Goodman et al.

(10) Patent No.: US 12,236,249 B2
(45) Date of Patent: Feb. 25, 2025

(54) MANAGEMENT OF DATA PROCESSING SYSTEMS USING UNDEFINE POLICIES

(71) Applicant: Dell Products L.P., Round Rock, TX (US)

(72) Inventors: Bradley K. Goodman, Nashua, NH (US); Kirk Alan Hutchinson, Londonerry, NH (US); Joseph Caisse, Burlington, MA (US)

(73) Assignee: Dell Products L.P., Round Rock, TX (US)

( * ) Notice: Subject to any disclaimer, the term of this patent is extended or adjusted under 35 U.S.C. 154(b) by 47 days.

(21) Appl. No.: 18/330,641

(22) Filed: Jun. 7, 2023

(65) Prior Publication Data

US 2024/0411565 A1 Dec. 12, 2024

(51) Int. Cl.
*G06F 11/00* (2006.01)
*G06F 9/445* (2018.01)
*G06F 11/14* (2006.01)

(52) U.S. Cl.
CPC ...... *G06F 9/44505* (2013.01); *G06F 11/1415* (2013.01)

(58) Field of Classification Search
CPC ............. G06F 11/3051; G06F 11/2289; G06F 11/004; G06F 11/0751; G06F 11/1415; G06F 9/44505; H04L 41/08; H04L 41/0893; H04L 41/0894; H04L 41/0895
See application file for complete search history.

(56) References Cited

U.S. PATENT DOCUMENTS

2014/0149989 A1* 5/2014 Kikuchi ................... G06F 8/65
  718/102
2016/0057027 A1* 2/2016 Hinrichs ............. H04L 41/5025
  709/224

* cited by examiner

*Primary Examiner* — Marc Duncan
(74) *Attorney, Agent, or Firm* — Womble Bond Dickinson (US) LLP

(57) ABSTRACT

Methods and systems for managing data processing systems are provided. Data processing systems may host various computer-implemented services. Data processing systems may also be changed to operate in different states where one or more currently hosted computer-implemented services may no longer be hosted in the new state. Removal of these no longer hosted computer-implemented services from the data processing systems may cause complications for the data processing systems in the new state. Undefine policies may be preconfigured for one or more hosted computer-implemented services to prevent occurrence of such complications.

20 Claims, 8 Drawing Sheets

MANAGEMENT OF DATA PROCESSING SYSTEMS USING UNDEFINE POLICIES

FIELD OF THE DISCLOSED EMBODIMENTS

Embodiments disclosed herein relate generally to management of data processing systems. More particularly, embodiments disclosed herein relate to systems and methods for managing services hosted on data processing systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
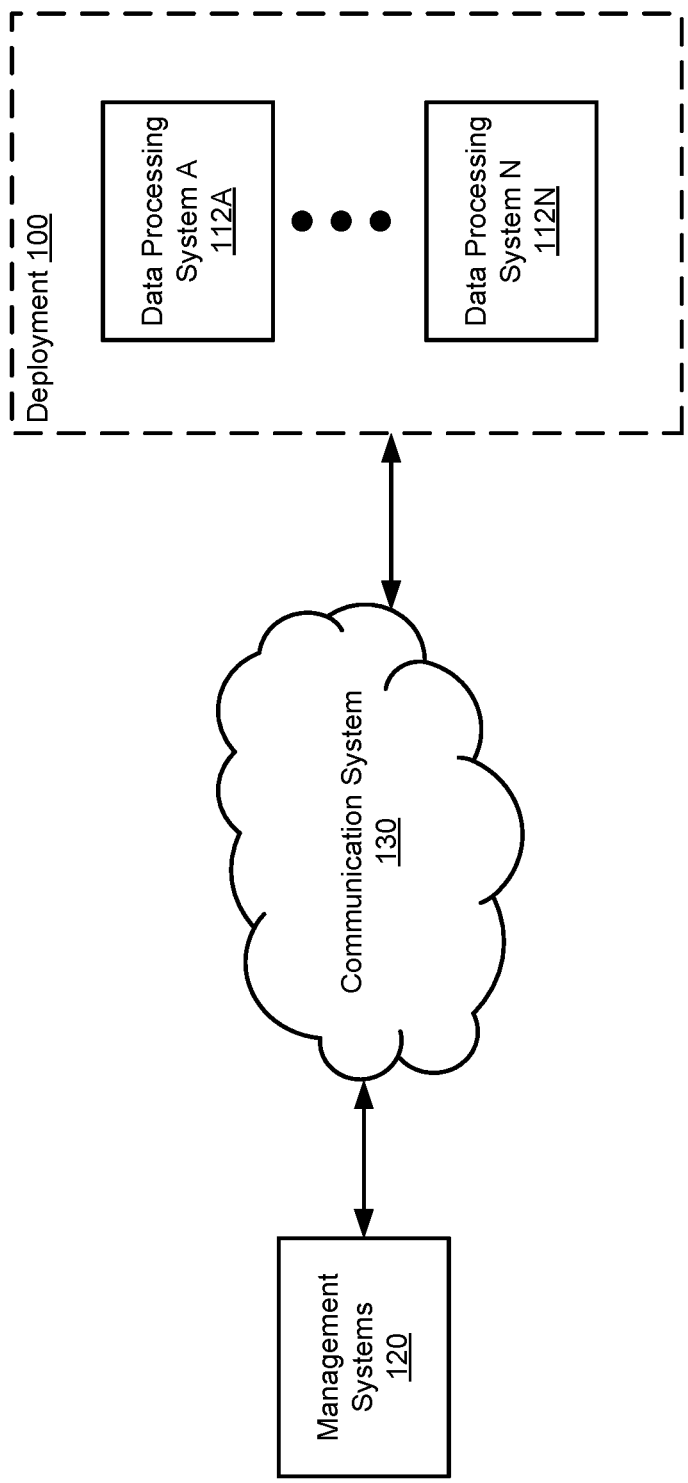
FIG. 1 shows a block diagram illustrating a system in accordance with an embodiment.

Various embodiments and aspects disclosed herein will be described with reference to details discussed below, and the accompanying drawings will illustrate the various embodiments. The following description and drawings are illustrative of the embodiments disclosed herein and are not to be construed as limiting the embodiments disclosed herein. Numerous specific details are described to provide a thorough understanding of various embodiments of embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data processing systems. Data processing systems may host various computer-implemented services (also referred to herein simply as "services"; e.g., virtual machines (VMs), applications, jobs, containers, or the like). Data processing systems may also be changed to operate in different states where one or more currently hosted computer-implemented services may no longer be hosted in the new state. Removal of these no longer hosted computer-implemented services from the data processing systems may cause complications for the data processing systems in the new state. Undefine policies may be preconfigured for one or more hosted computer-implemented services to prevent occurrence of such complications.

Additionally, unlike data processing systems configured as imperative systems, data processing systems configured as declarative systems receive a declarative statement (e.g., a declarative command) defining a desired state of the declarative system and executes one or more processes to achieve the desired state (e.g., transition the data processing system from a current state to the desired state (also referred to herein as a "desired operating state"). In such declarative systems, what processes are being as the one or more processes is immaterial as long as the system is able to reach the desired state. Said another way, a declarative system will always and forever strive to make the desired state happened until instructed otherwise. However, in the process of making the desired state happen, a declarative system may execute one or more processes that it is not originally intended (e.g., not originally configured) to be executed, which may lead to potentially unforeseen (even destructive) consequences.

For example, a data processing system may be an endpoint device that is originally provisioned (e.g., by a first individual with administrative privileges at a central information technology (IT) location) and deployed as System A that hosts one or more predefined System A services. After being deployed, System A may be configured (intentionally or unintentionally) by a different individual (e.g., an individual such as a local, on-site, or operational technology (OT) person at the location of deployment with a lower level of administrative privileges than the first individual) to operate as System B that hosts one or more predefined System B services that are identical to and/or different from the System A services. In transitioning to the desired state (e.g., the System B), one or more of the System A services not required (e.g., defined, to be hosted, or the like) on System B may be classified as an undefined service. The data processing system may determine that to fully reach the desired state, such undefined services must be terminated (e.g., killed, gracefully shutdown, or the like). In the process of terminating such undefined services, data associated with undefined services (e.g., historical transactional data, cache data, or the like) may also potentially be removed and/or deleted. Such termination and removal of these undefined services and their associated data could be a potential unforeseen and/or destructive consequence for the first individual who never intended for System A to become System B (and/or may have wanted to use the removed data associated with the undefined services for other purposes).

To prevent such potential unforeseen and/or destructive consequences from occurring when such data processing systems (e.g., data processing systems configured as declarative systems) transition from a first state (e.g., a current state) to a second state (e.g., a desired operating state, an unintended operating state, or the like), one or more undefine policies may be pre-set for each service (and for each volume of data associated with each service) hosted on data processing systems.

For example, in the above example of the Red (e.g., System A) and Green (e.g., System B) Systems, the first individual with higher administrative privileges may configure the Red System with one or more undefine policies that disallow for the removal of a specific Red System service and all data associated with all preexisting Red System services. These undefine policies may have precedence over other processes (e.g., actions) executed by the data processing system. Said another way, these undefine policies may bar one or more actions from being executed when a data processing system attempts to transition from a first state to a second state (e.g., bar the termination of the specific Red System service and the removal/deletion of all data associated with all preexisting Red System services). Consequently, the above-discussed potential unforeseen and/or destructive consequences caused by any (e.g., intentional, unintentional and/or incorrect) changes to an operating state of the data processing system by individuals unaware of the original intended configuration/use of these systems can advantageously be avoided, which directly improves the management of data processing systems.

Additionally, use of the undefine policies also allows for improved separation of roles and privileges within an entity. For example, an individual with higher administrative privileges can be permitted to describe (e.g., using the undefine policies) exactly what actions are allowed and/or disallowed by a data processing system while another individual with lower administrative privileges (e.g., less than the first individual or none at all) cane be permitted to build, install, and/or configured the data processing system without needing to know (or being privileged to specify) the allowed and/or disallowed actions. As a result, a simple and improved way for managing data processing systems within large, complex entities with many layers of people and/or administration can be achieved.

Even further, such use of the undefine policies advantageously prevents even a small, simple (sometimes inadvertent) change to a single data processing system from causing widespread (or potentially unforeseen, even destructive) consequence(s) to any other data processing systems that are operably connected to the single data processing system. For example, a deployment (discussed in more detail below in reference to FIG. 1) may include at least two data processing systems: data processing system A and data processing system B. Data processing system B may host a service B that works in tandem with (or utilizes data collected by) a service A hosted on data processing system A. In this situation, a small, simple (sometimes inadvertent) change to data processing system A that causes data processing system to enter a desired state where service A (and its data) is removed from data processing system A will also cause data processing system B to be unable to continue its operations (namely, service B can no longer run without service A).

In an embodiment, a computer-implemented method of managing data processing systems is provided. The method may include making an identification that a service hosted at least in part by the data processing system is classified as an undefined service, the service being classified as the undefined service by a transition of the data processing system from a first state to a second state, and the second state being a desired operating state for the data processing system. Based on the identification, the method may further include making a determination regarding whether the service is subject to an undefine policy. In a first instance of the determination where the service is subject to the undefine policy, the method may further include performing a first action set based on the undefine policy to attempt to transition the data processing system to the desired operating state, the first action set transitioning the data processing system to a third state; and in a second instance of the determination where the service is not subject to any undefine policies, the method may further include performing a second action set to attempt to transition the data processing system to the desired operating state, the second action set transitioning the data processing system to a fourth state.

In an instance where the third state is different from the desired operating state, the method may further include issuing an error to notify a user of the data processing system that the data processing system is unable to enter the desired operating state.

In the desired operating state of the data processing system, the service is not hosted by the data processing system.

Issuing the error comprises providing instructions for the user to revert the data processing system to the first state.

The undefine policy specifies at least one requirement from a group of requirements consisting of: an operating retention policy that defines allowable changes and/or unallowable changes in operation of the service; and a data retention policy that defines allowable changes and/or unallowable changes in data of the service.

The unallowable changes in the operation of the service comprise at least one of killing the service, shutting down the service, and removing the service from being hosted by the data processing system.

The unallowable changes in the data of the service comprise removing the data from storage of the data processing system.

The method further includes ingesting the second state into an automation engine to obtain a first set of actions, and in the first instance of the determination where the service is subject to the undefine policy, the method further includes: identifying a portion of actions of the first set of actions barred for performance by the undefine policy; and resolving the first set of actions based on the portion of the actions to obtain the first action set.

In an embodiment, in the second instance of the determination where the service is not subject to any undefine policies, the method further includes: using the first set of actions as the second action set.

In an embodiment, the automation engine is adapted to identify actions to be performed to modify the first state to match the second state, the first state being a current state of the data processing system when the identification is made.

In an embodiment, the method further includes: obtaining a declarative statement defining, at least in part, the second state; and classifying the service as being an undefined service due to a change in operating state of the service in the second state when compared to an operating state of the service in the first state.

A non-transitory media may include instructions that when executed by a processor cause any of the computer-implemented methods to be performed.

A data processing system may include the non-transitory media and a processor, and may perform any of the computer-implemented methods when the computer instructions are executed by the processor.

Turning to FIG. 1, a block diagram illustrating a system in accordance with an embodiment is shown. The system shown in FIG. 1 may provide computer-implemented services. The computer-implemented services may include any type and quantity of computer-implemented services. For example, the computer-implemented services may include data storage services, instant messaging services, database services, and/or any other type of service that may be implemented with a computing device.

To provide the computer implemented services, the system may include deployment 100. Deployment 100 may be operated by an entity (e.g., a business) and include any number of the data processing systems 112A-112N (e.g., endpoint devices).

Deployment 100, as noted above, may provide computer-implemented services using any number of data processing systems 112A-112N. To do so, data processing systems 112A-112B may enter operating states as defined by management systems 120.

To define the operating states of data processing systems 112A-112B, may use declarative statements regarding desired activities to be performed by data processing systems 112A-112B. Data processing systems 112A-112B may interpret these declarative statements, and attempt to perform any number of actions (that are not explicitly specified by management systems 120) to complete the desired activities specified by management systems 120.

For example, management systems 120 may specify that (i) workloads should be hosted by any of data processing systems 112A-112N, (ii) any of data processing systems 112A-112N should adopt certain personalities, etc. To meet any of these declared objectives, data processing systems 112A-112N may identify and perform actions that may conform the behavior of data processing systems 112A-112N to reach the declared objectives.

However, when a declarative statement is made by any of management systems 120 (e.g., as specified by a user of management systems 120), the specific actions that a data processing system may take based on the declarative statement may be unclear to the issuer of the declarative statement. Consequently, issuance of a declarative statement may have unforeseen and/or undesired outcomes on the operation of a data processing system.

For example, issuing a declarative statement such as changing a personality of a data processing system may cause a data processing system to treat previously instantiated entities such as virtual machines and containers as no longer being part of the newly declared objective for the data processing system (e.g., the entities may be "undefined"). If entities are undefined, the automation implemented by the data processing system may cause the entities and corresponding data to be removed. This may lead to undesired outcomes such as permanent data loss, longer durations of time to conform the operation of data processing systems to desired operation, etc.

In general, embodiments disclosed herein relate to systems, methods, and devices for managing the operation of data processing systems using declarative statements. The disclosed methods may reduce the likelihood of undesired actions being performed by the data processing systems responsive to declarative statements.

To reduce the likelihood of undesired actions being performed, a data processing system in accordance with embodiments disclosed herein may implement an automation engine that uses declarative statements and undefine policies to decide on activities to be performed to conform the operation of the data processing system to desired states (e.g., as defined by undefine policies). The undefine policies may limit the activities that may be performed when entities hosted by a data processing system become undefined due to issued declarative statements.

For example, the undefine policies may limit the manner in which entities may be shut down, suspended from operation, and/or removed. Further, the undefine policies may limit how the data corresponding to the entities is treated when the corresponding entities is undefined. For example, the undefine policies may specify whether data may be removed, whether backups of the data are to be retained, etc.

By doing so, embodiments disclosed herein may facilitate management of the operation of data processing systems using declarative statements while reducing the likelihood of undesired outcomes from occurring when declarative statements are issued.

To provide the above noted functionality, the system of FIG. 1 may include management systems 120 and deployment 100. Each of these components is discussed below.

Management systems 120 may, as noted above, facilitate issuance of declarative statements with respect to the data processing systems of deployment 100. Management systems 120 may do so by, for example, obtaining user input and/or implementing automation systems to define the declarative statements. Once defined, the declarative statements may be sent to data processing systems 112A-112N for implementation.

As discussed above, each data processing system 112A-112N may be configured as a declarative system that may strive to transition to a desired state (e.g., defined by one or more declarative statements) until instructed otherwise. Additionally, each data processing system 112A-112N may be configured to host any number of predefined services (e.g., predefined by an administrator configuring and deploying the data processing systems 112A-112N through issuance of declarative statements). Before being deployed to deployment 100 (and/or while being setup for deployment at deployment 100) each data processing system 112A-112N may be configured to include the above-discussed undefine policies, and/or the undefine policies may be added overtime (e.g., when new declarative statements are made, undefine policies for entities instantiated due to the new declarative statements may be added). As discussed above, such pre-configuration and/or dynamic configuration of these undefine policies may protect one or more services and/or data associated with these services existing on the data processing systems 112A-112N from potentially unforeseen, even destructive consequences resulting of (intentional or intentionally) changes made to the data processing systems 112A-112N overtime while the data processing systems 112A-112N are operating at deployment 100.

Any of (and/or components thereof) deployment 100 and data processing systems 112A-112N may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 6. Additional details of the data processing systems 112A-112N are discussed below in reference to FIG. 2.

Any of the components illustrated in FIG. 1 may be operably connected to each other (and/or components not illustrated) with communication system 130. In an embodiment, communication system 130 includes one or more networks that facilitate communication between any number of components (e.g., the data processing systems 112A-

112N with other computing devices (not shown) (e.g., computing devices belonging to data processing systems 112A-112N administrators that are located at a location remote from the deployment). The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

Figure 2:
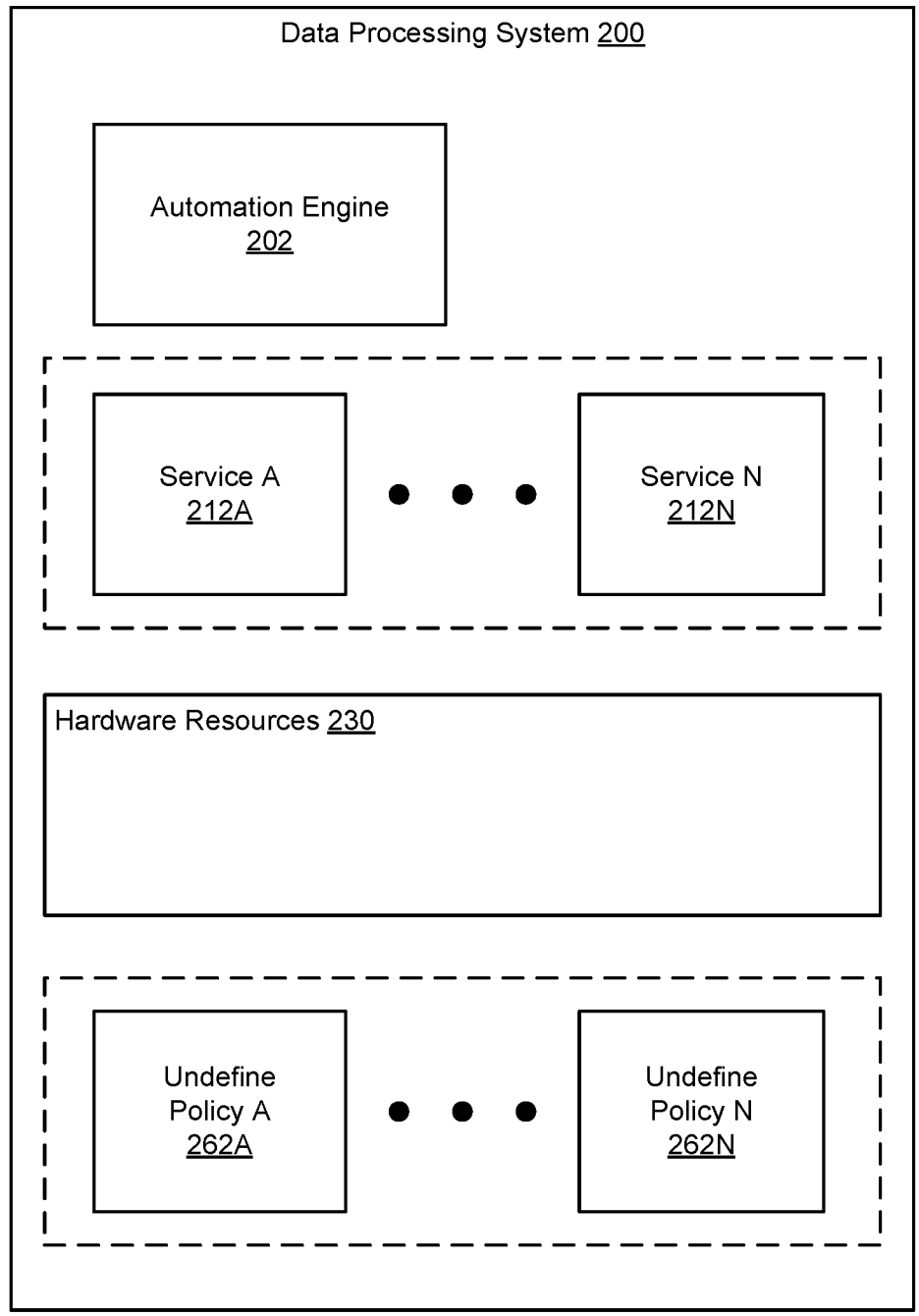
FIG. 2 shows a block diagram illustrating a data processing system in accordance with an embodiment.

Turning to FIG. 2, a block diagram illustrating an example data processing system 200 (e.g., any one of data processing systems 112A-112N of FIG. 1) in accordance with an embodiment is shown. The data processing system 200 shown in FIG. 2 provide services (e.g., computer-implemented services) by executing computing instructions with at least one processing devices (e.g., a processor).

Data processing system 200 host any number of services 212A-212N (e.g., virtual machines (VMs), applications, jobs, containers, or the like) to provide computer-implemented services to users and/or other computing devices operably connected to data processing system 200 thereby completing workloads. Different data processing systems may provide similar and/or different computer-implemented services.

Each of the services 212A-212N may be associated with one or more volumes (not shown; e.g., databases, data structures, or the like) storing data associated with each service 212A-212N. For example, service 212A may be a virtual machine (VM) associated with a 500 MB (or any other size) volume created for the VM, for example, in a memory of the data processing system 200 that stores operating data (e.g., persistent data) associated with the use and/or operation of the VM.

To host the services 212A-212N and provide the computer-implemented services, data processing systems 112A-112N may include hardware resources 230. Hardware resources 230 may include any quantity and type of hardware device usable to contribute computing resources (e.g., processing resources, memory resources, storage resources, etc.) usable to provide the computer-implemented services. For example, hardware resources 230 may include processors, memory devices, storage devices, communication devices, and/or other types of hardware devices.

In an embodiment, the data processing system 200 may further include an automation engine 202. In some embodiments, data processing system 200 may include multiple automation engines 202. The automation engine(s) 202 may facilitate (e.g., using any combination of the hardware resources 230) the implementation of one or more protocols, services, and/or features of the data processing system 200 including the hosting of the services 212A-212N and the providing of the computer-implemented services using the services 212A-212N.

For example, the automation engine(s) 202 may be configured to (automatically) process one or more declarative statements obtained (e.g., received) by the data processing system 200 to transition (or attempt to transition) the data processing system 200 from a current state to a state (e.g., a desired operating state) defined by the declarative statement. Additional details with regard to how the automation engine 202 processes declarative statements to transition (or attempt to transition) from a current state to a desired operating state is discussed below in reference to FIG. 3.

Additionally, the automation engine 202 may interact with (e.g., use) any combination of the hardware resources 230 to perform all or a portion of the functions below in reference to the flow diagram of FIG. 3.

In an embodiment, the data processing system 200 may be pre-configured with one or more undefine policies 262A-262N. Each undefine policy 262A-262N may be code (e.g., computer programming code) that defines one or more allowable and/or unallowable changes (e.g., actions) to be executed on one or more of the services 212A-212N and/or one or more volumes storing data associated with the services 212-212N (also referred to herein as "data of the service(s)"). For example, the allowable and/or unallowable changes in the operation of the service may include at least one of: retaining the service, killing the service, performing a graceful shutdown of the service, removing the service from being hosted by the data processing system 200, or the like. The allowable and/or unallowable changes in the may include at least one of: removing the data from storage (e.g., memory) of the data processing system 200, retaining the data in the storage, backing up the data to a different location (e.g., a remote storage operably connected to data processing system 200, another data processing system 200, or the like), or the like. Other changes and/or actions to the service and/or the data of the services not listed above may also be included without departing from the scope of one or more embodiments disclosed herein.

Each service 212A-212N and each data of the services 212A-212N may be associated (e.g., provided with) one or more undefine policies 262A-262N. Said another way, each service 212A-212N may be pre-configured with an undefine policy 262A-262N, and each data of the services 212A-212N may also be pre-configured with an undefine policy 262A-262N. In an embodiment, the undefine policies may be stored in a memory (e.g., a memory making up the hardware resources 230) of the data processing system.

In an embodiment, each undefine policy 262A-262N may be added, deleted, and/or modified (at a physical location of the data processing system 200 or remotely) by an individual having a level of administrative privileges equal to or greater than a predefined administrative privilege threshold. Each undefine policy 262A-262N may be added, deleted, and/or modified at any time (e.g., when the data processing system 200 is being initialized before a first deployment of the data processing system 200, after a first deployment of the data processing system 200, or the like). And each undefine policy 262A-262N may be added, deleted, and/or modified whenever one or more services 212A-212N are added and/or removed from the data processing system 200.

Each undefine policy 262A-262N may be executed when its respective service or data of the service becomes classified as undefined. A service and/or a data of the service is classified as undefined (e.g., an undefined service or an undefined data of the service) when the data processing system 200 (e.g., via automation engine 202) determines that there are no rules, policies, definitions, actions, or the like that indicate that the service should be hosted. This may happen, for example, when the data processing system 200 is being transitioned (e.g., by the automation engine) from a first state including an existing service to a second state where the existing service is no longer required to be hosted by the data processing system 200. For example, a data processing system 200 may initially be deployed as a Point-of-Sale (POS) kiosk that hosts a PoS application (e.g., a service). At some point in time, the PoS kiosk may be (intentionally or unintentionally) changed to operate as an interactive menu kiosk. The configurations (e.g., rules, policies, definitions, or the like) of the interactive menu kiosk no longer includes the PoS application. As a result, when the PoS kiosk is transitioning to the interactive menu kiosk, the automation engine 202 may classify the POS application as an undefined service. Other situations that may cause a service (and its respective data) to become undefined may include, but is not limited to: receipt of an explicit request to stop or delete the service; an underlying change to the data processing system resulted in the automation engine 202 concluding that the service should no longer be hosted; deletion or removal of a required (or prerequisite) resource of a service; or the like.

While illustrated in FIG. 2 as included a limited number of specific components, the example data processing system 200 in accordance with an embodiment may include fewer, additional, and/or different components than those illustrated therein.

Figure 3:
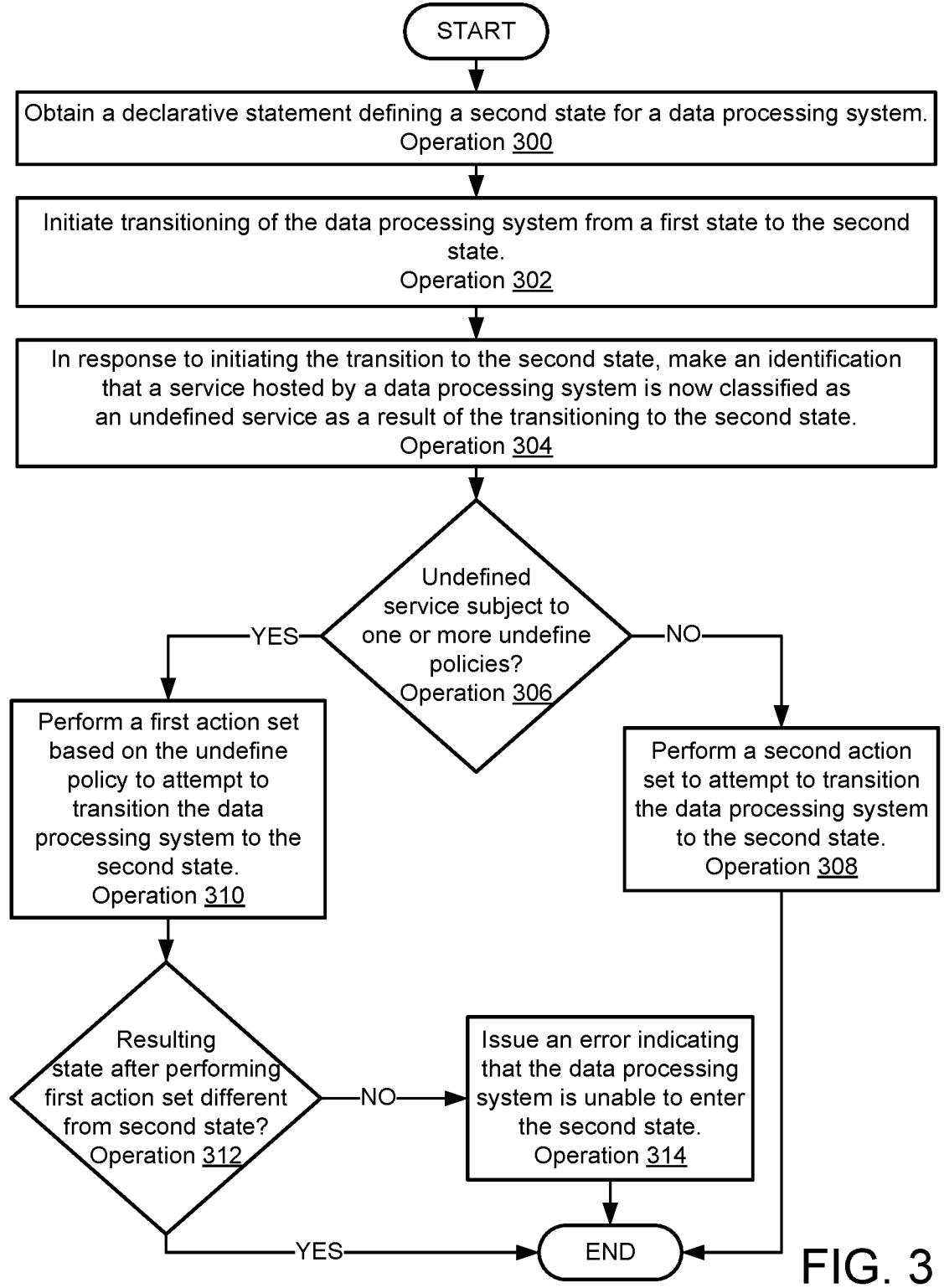
FIG. 3 shows a flow diagram illustrating a method of managing data processing systems in accordance with an embodiment.

Turning to FIG. 3, a flow diagram illustrating a method for managing data processing systems in accordance with an embodiment is shown. The method may be performed by a data processing system (e.g., data processing systems 112A-112N and data processing system 200 of FIGS. 1 and 2, respectively) or portions thereof (e.g., by automation engine 202 of FIG. 2).

At operation 300, a declarative statement defining a desired operating state (e.g., a second state) of a data processing system may be obtained. The declarative statement may be obtained from any source (e.g., directly input into the data processing system by a user, transmitted from another data processing system over a network, transmitted by another computing device operably connected to the data processing system, or the like). For example, the declarative statement may indicate that a currently operating data processing system should be changed into a PoS kiosk.

In an embodiment, the declarative statement may define (e.g., indicate) what services (e.g., services 212A-212N of FIG. 2) should be hosted on the data processing system in the desired operating state. The declarative statement may also indicate what existing data of services should be retained on (or deleted from) the data processing system in the desired operating state.

At operation 302, the transitioning of the data processing system from a current state (e.g., a first state) of the data processing system to the second state is initiated (e.g., by the automation engine).

In an embodiment, during the initiation of the transition, the automation engine may be adapted to identify actions (e.g., a first set of actions) to be performed to modify the first state to match the second state (where the first state may be a current state of the data processing system when the identification of the actions to be performed is being made). The automation engine may be adapted to identify the first set of actions to be performed by ingesting the second state (e.g., taking in and parsing the declarative statement). More specifically, upon ingesting the second state, the automation engine may determine a difference (e.g., a delta) between the first state and the second state, and use this delta to generate the first set of actions.

At operation 304, in response to initiating the transition to the second state, an identification that a service hosted by a data processing system is now classified as an undefined service as a result of the transitioning to the second state is made. In particular, this includes classifying the service as being an undefined service due to a change in operating state of the service in the second state when compared to an operating state of the service in the first state.

More specifically, in an embodiment, upon ingesting the second state, the automation engine may determine that one or more current services hosted in the current state (e.g., the first state) of the data processing system may no longer be defined in the second state. Continuing with the above example, the declarative statement indicating that a currently operating data processing system should be changed into a PoS kiosk may only specify (e.g., indicate) that the POS kiosk only hosts a PoS application without any explicit restrictions as to what data (e.g., the data of services hosted in the current state of the data processing system) can be retained in the second state. In this example, all existing services hosted in a current state of the data processing system that are not the POS application will be classified as undefined services. All data of the services that are classified as undefined services will also be classified as undefined.

In the above example, assume that the declarative statement instead indicates that the PoS kiosk only hosts a PoS application but all data (namely, data of the services) currently stored in the memory/storage of the data processing system should be retained. In this example situation, although the services will be classified as undefined, the data of the services will not be classified as undefined.

In operation 306, a determination is made regarding whether any services (e.g., any existing services hosted in the current state of the data processing system) are subject to one or more undefine policies. In an embodiment, the determination may be made based on the identification of the undefined services in operation 304.

In an instance of the determination (e.g., the determination of operation 306) where no services are subject to any undefine policies (e.g., NO in operation 306), the process proceeds to operation 308.

In particular, in operation 308, a second action set is performed to attempt to transition the data processing stem to the second state (e.g., the desired operating state defined by the declarative statement obtained in operation 300). In an embodiment, in the instance of the determination where the service is not subject to any undefine policies, the above-discussed first set of actions (e.g., the first set of actions generated by the automation engine upon ingesting the second state) is used as the second action set. Upon executing the second action set (e.g., by the automation engine), the data processing system may be transitioned to a fourth state.

In an embodiment, the fourth state may match (e.g., be identical to) the second state. If for any reason the fourth state does not match the second state (e.g., as identified by the automation engine), an error indicating that the data processing system is unable to enter the second state may be displayed (and/or transmitted, output, notified, or the like) to a user of the data processing system. This error is discussed in more detail below in reference to operation 314.

The method may end following operation 308.

In an instance of the determination (e.g., the determination of operation 306) where a service is subject to an undefine policy (e.g., YES in operation 306), the process proceeds to operation 310.

In operation 310, a first action set is performed based on the undefine policy to attempt to transition the data processing system to the desired operating state. In an embodiment, in the instance of the determination where a service is subject to the undefine policy, the automation engine may identify whether one or more (e.g., a portion) of actions of the first set of actions (e.g., the first set of actions generated by the automation engine upon ingesting the second state) are barred for performance by the undefine policy.

In an embodiment, as discussed above, the undefine policy specifies at least one requirement from a group of requirements consisting of: an operating retention policy that defines allowable changes and/or unallowable changes in operation of the service; and a data retention policy that defines allowable changes and/or unallowable changes in data of the service. For example, the allowable and/or unallowable changes in the operation of the service may include at least one of: retaining the service, killing the service, performing a graceful shutdown of the service, removing the service from being hosted by the data processing system 200, or the like. The allowable and/or unallowable changes in the may include at least one of: removing the data from storage (e.g., memory) of the data processing system 200, retaining the data in the storage, backing up the data to a different location (e.g., a remote storage operably connected to data processing system 200, another data processing system 200, or the like), or the like.

In the event that no actions of the first set of actions are barred for performance by the undefine policy, the first set of actions may be used as the first action set. Alternatively, in the event that at least one action of the first set of actions is barred for performance by the undefine policy, the automation engine may resolve the first set of actions based on the at least one barred action to obtain the first action set. Said another way, the first action set will not include the at least one barred action. In an embodiment, execution of the first action set will cause the data processing system to transition (e.g., enter) into a third state (which may or may not be identical to the second state).

For example, continuing with the above example where a data processing system is being transitioned to a PoS kiosk, assume that only one existing service in the first state of the data processing system is subject to an undefine policy and that the undefine policy indicates that termination of this one existing service is disallowed. Further assume that the data of this one existing service is also subject to an undefine policy (e.g., a separate undefine policy from the undefine policy associated with the service itself) and that the undefine policy indicates that removal/deletion of the data is disallowed. In such an example, the first action set to be performed to attempt to transition the data processing system to the PoS kiosk will not include: (i) termination of the one existing service; and (ii) removal/deletion of the data associated with the one existing service. Execution of this first action set will cause the data processing system to enter a third state where the one existing service and its data are both retained on the POS kiosk.

In operation 312, a determination is made (e.g., by the automation engine) as to whether a resulting state (e.g., the third state) after performing the first action set (e.g., in operation 310) is different from the second state (e.g., the desired operating state).

In an instance of the determination (e.g., the determination in operation 312) where the third state is different from the desired operating state (e.g., NO in operation 312), the process proceeds to operation 314. In operation 314, the data processing system issues (e.g., via the automation engine) an error to notify a user of the data processing system that the data processing system is unable to enter the desired operating state.

In an embodiment, the notification may include an indication that user intervention is required because the automation engine is unable to execute any additional actions (e.g., because the actions are barred by the undefine policies) to successfully transition the data processing system into the desired operating state. For example, the notification may include instructions for the user to revert the data processing system to the first state. The notification may also include instructions for the user to update (e.g., modify) one or more rules and/or policies (e.g., the undefine policies barring the additional actions) such that the data processing system may successfully transition into the second state.

The method may end following operation 314.

Alternatively, in an instance of the determination (e.g., the determination in operation 312) where the third state is determined to be the same (e.g., matches) the desired operating state (e.g., YES in operation 312), the method may end since the data processing system has been successfully transitioned from the first state to the second state (e.g., the desired operating state defined by the declarative statement obtained in operation 300).

Figure 4A:
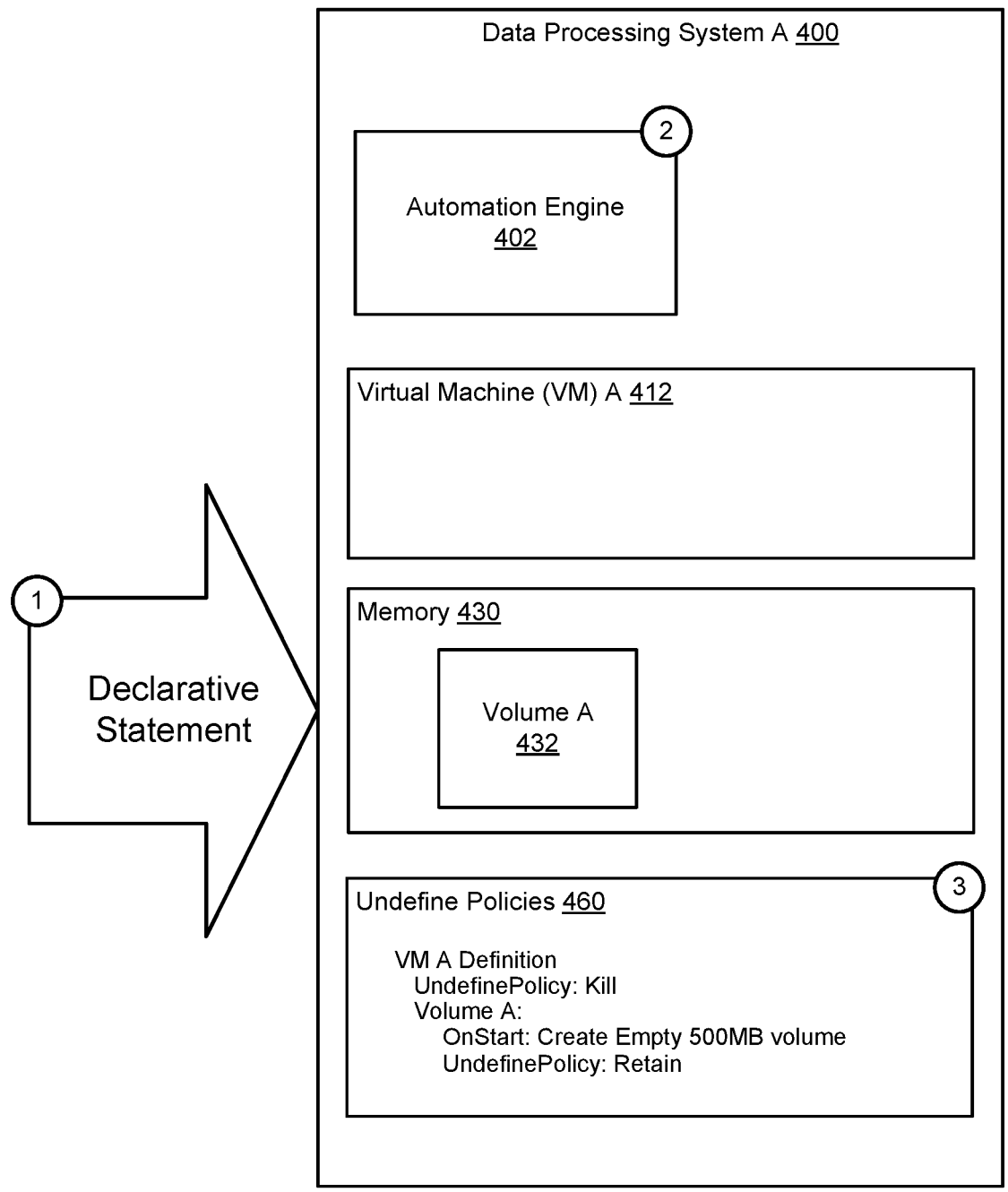
FIGS. 4A-4C show diagrams illustrating an implementation example in accordance with an embodiment.
Figure 4B:
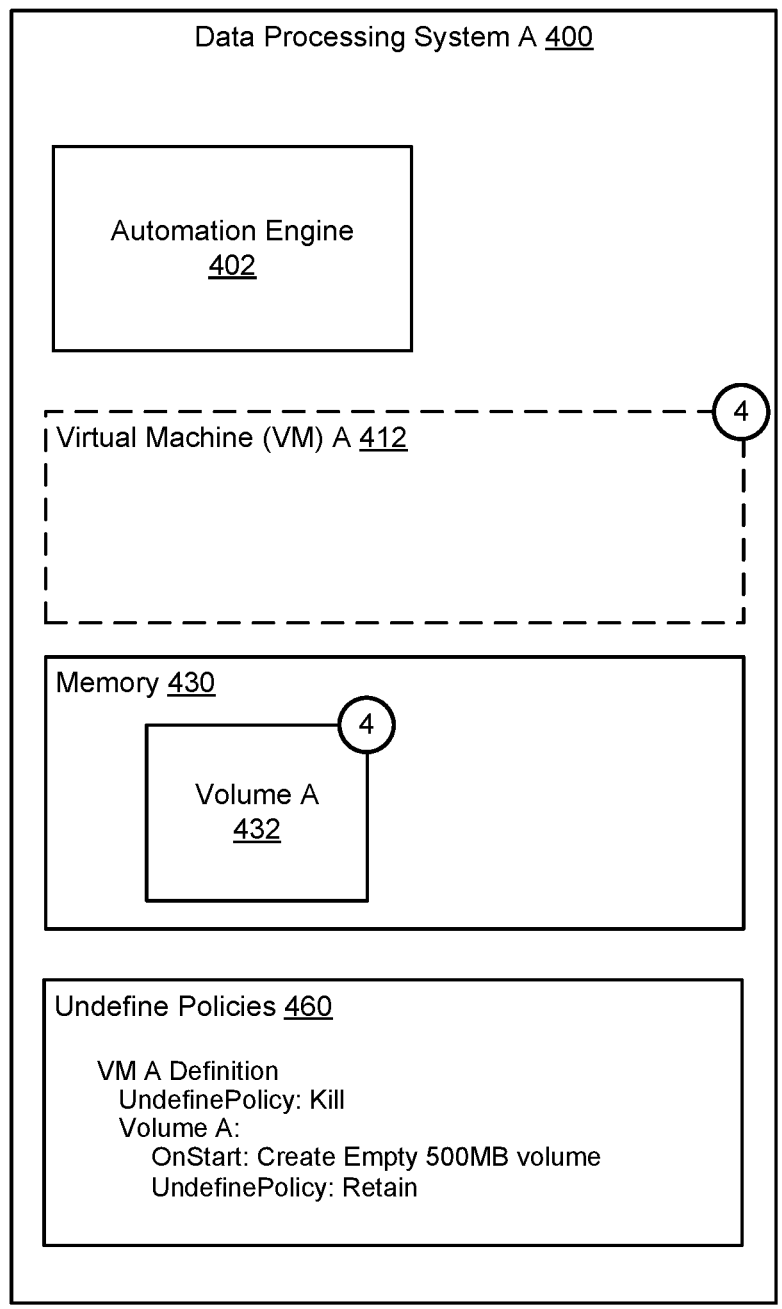
Figure 4C:
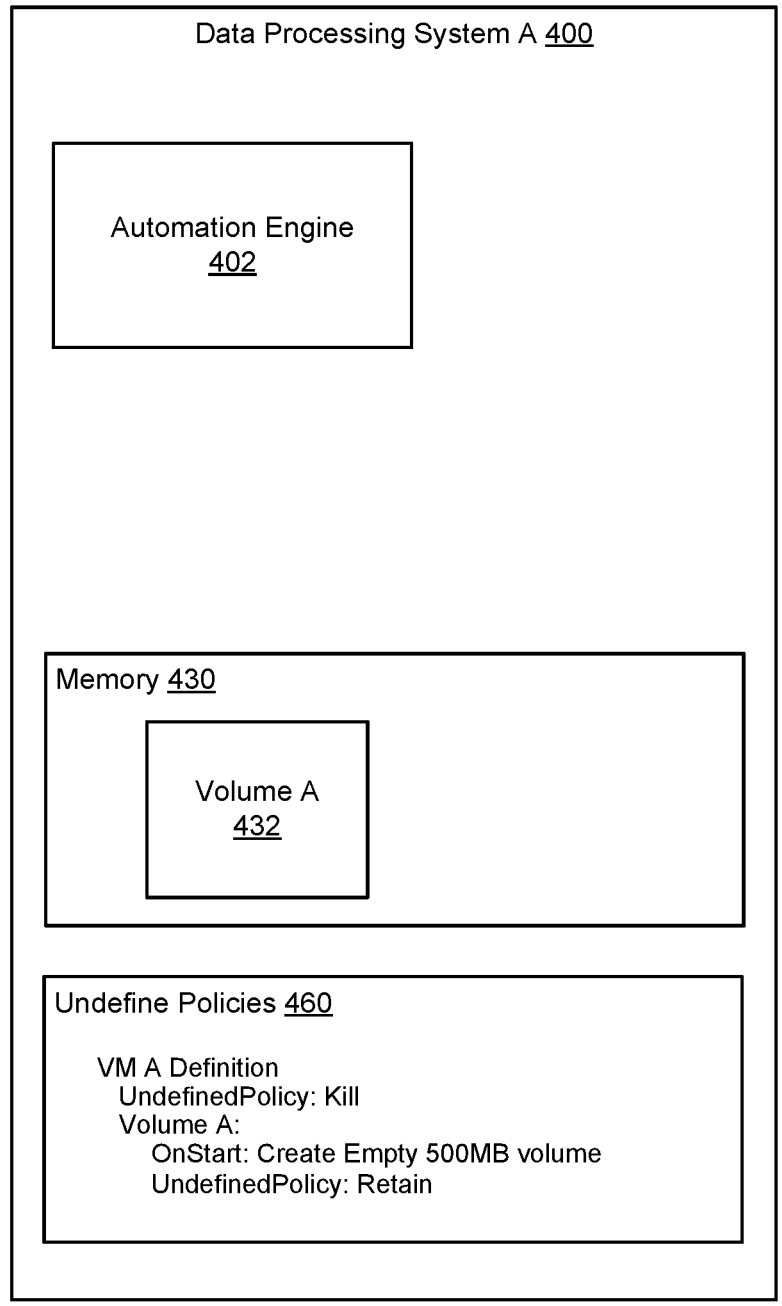

Turning now to FIGS. 4A-4C, to further clarify embodiments of the disclosure, an implementation example of managing a data processing system is provided. The numbers in the brackets below, e.g., "[1]", correspond to the same circled numbers in FIGS. 4A-4C.

Starting with FIG. 4A, a data processing system A 400 (e.g., data processing system 200 of FIG. 2) is shown to include an automation engine 402 (e.g., automation engine 202 of FIG. 2), a virtual machine (VM) A 412 that is being hosted as a service (e.g., services 212A-212N of FIG. 2) on data processing system A 400, a memory 430 storing volume A 432 (e.g., data of the VM A 412), and undefine policies 460 (e.g., undefine policies 262A-262N of FIG. 2).

As shown in FIG. 4A, the undefine policies 460 include: (i) a first undefine policy for VM A 412 indicating that VM A 412 should be killed should VM A become (e.g., be classified as) an undefined service; and (ii) a second undefine policy for volume A 432 indicating that volume A 432 should be retained should volume A 432 become (e.g., be classified as) undefined.

As further shown in FIG. 4A, the data processing system A 400 receives a declarative statement defining a desired operating state of the data processing system A 400 [1]. Assume here that the declarative statement does not explicitly exclude volume A 432 from existing in the desired operating state.

Upon receiving the declarative statement, the automation engine 402 generates a first set of actions to be used to attempt to transition the data processing system A 400 to the desired operating state [2]. Assume here that VM A 412 is not defined in the desired operating state. As a result, the first set of actions include (among other actions) at least: (i) terminate VM A 412; and (ii) delete volume A 432.

Prior to executing (e.g., performing) the first set of actions, the automation engine 402 determines that VM A 412 and volume A 432 are subject to undefine policies [3]. Based on the undefine policies 460, automation engine determines that deletion of volume A 432 is barred. Automation engine 402 resolves the first set of actions based on this determination to obtain a first action set including (among other actions) at least: (i) kill VM A 412; and (ii) retain volume A 432.

Turning now to FIG. 4B, automation engine performs the first action set to kill VM A 412 and retain volume A 432 to transition data processing system A 400 to a third state [4].

Finally, FIG. 4C shows the data processing system A 400 in the third state. Because the third state matches (e.g., is identical to) the desired operating state where VM A 412 does not exist (and retaining of volume A 432 is irrelevant because declarative statement does not explicitly exclude volume A 432 from existing in the desired operating state), the data processing system A 400 completes the transition to the desired operating state and continues its operation as the desired operating state.

Figure 5:
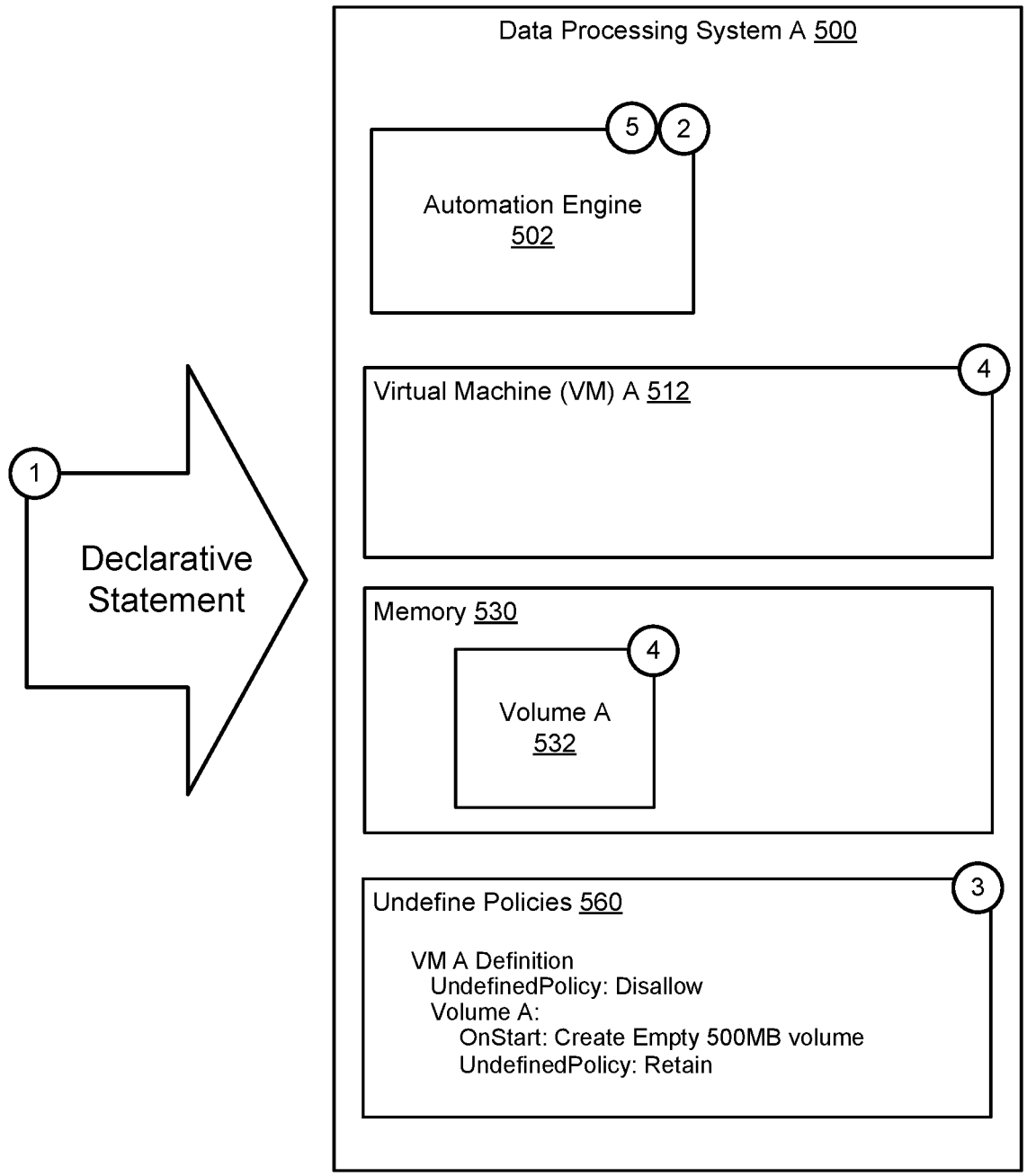
FIG. 5 shows a diagram illustrating an implementation example in accordance with an embodiment.

Turning now to FIG. 5, to further clarify embodiments of the disclosure, an implementation example of managing a data processing system is provided. Similar to FIGS. 4A-4C, the numbers in the brackets below, e.g., "[1]", correspond to the same circled numbers in FIG. 5.

As shown in FIG. 5, a data processing system A 500 (e.g., data processing system 200 of FIG. 2) is shown to include an automation engine 502 (e.g., automation engine 202 of FIG. 2), a virtual machine (VM) A 512 that is being hosted as a service (e.g., services 212A-212N of FIG. 2) on data processing system A 500, a memory 530 storing volume A 532 (e.g., data of the VM A 412), and undefine policies 560 (e.g., undefine policies 262A-262N of FIG. 2).

In FIG. 5, the undefine policies 560 include: (i) a first undefine policy for VM A 512 indicating that termination of VM A 512 is disallowed should VM A become (e.g., be classified as) an undefined service; and (ii) a second undefine policy for volume A 432 indicating that volume A 532 should be retained should volume A 532 become (e.g., be classified as) undefined.

As further shown in FIG. 5, the data processing system A 500 receives a declarative statement defining a desired operating state of the data processing system A 500 [1]. Assume here that the declarative statement does not explicitly exclude volume A 532 from existing in the desired operating state.

Upon receiving the declarative statement, the automation engine 502 generates a first set of actions to be used to attempt to transition the data processing system A 500 to the desired operating state [2]. Assume here that VM A 512 is not defined in the desired operating state. As a result, the first set of actions include (among other actions) at least: (i) terminate VM A 512; and (ii) delete volume A 532.

Prior to executing (e.g., performing) the first set of actions, the automation engine 502 determines that VM A 512 and volume A 532 are subject to undefine policies [3]. Based on the undefine policies 560, automation engine 502 determines that termination of VM A 512 and the deletion of volume A 532 are both barred. Automation engine 502 resolves the first set of actions based on this determination to obtain a first action set including (among other actions) at least: (i) disallow termination of VM A 512; and (ii) retain volume A 532.

Automation engine then performs the first action set to disallow termination of VM A 512 and retain volume A 532 to transition data processing system A 500 to a third state [4].

Upon transitioning data processing system A 500 to the third state, automation engine 502 determines that: (a) the third state is different from the desired operating state; and (b) no additional actions (e.g., kill or shutdown of VM A 512) can be performed to transition data processing system A 500 into the desired operating state because of the undefine policies 560 [5]. As a result, automation engine 502 issues an error to notify a user of the data processing system A 500 that the data processing system A 500 is unable to enter the desired operating state, and that user intervention by the user is required.

Figure 6:
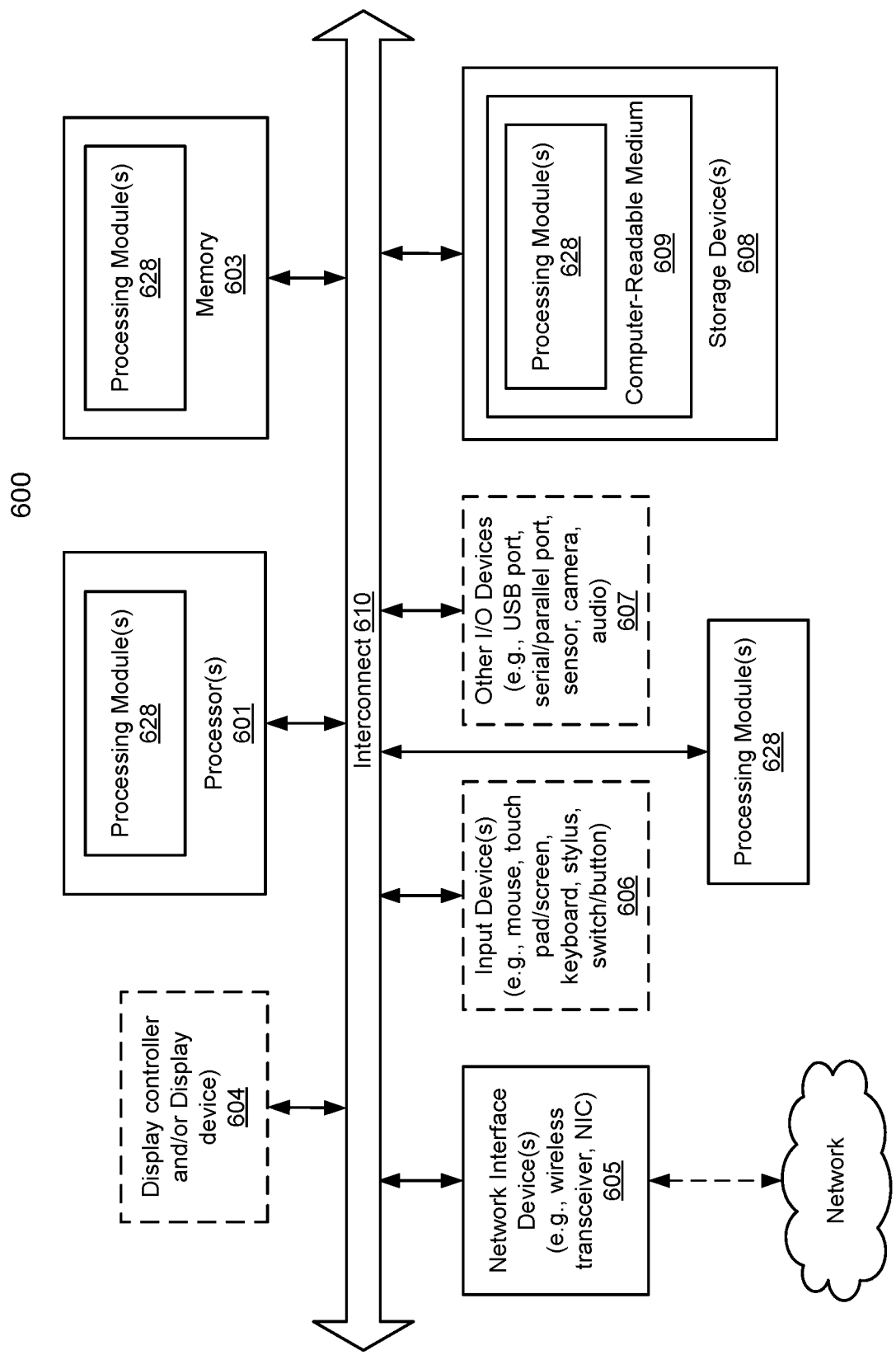
FIG. 6 shows a block diagram illustrating a data processing system in accordance with an embodiment.

Any of the components illustrated in FIGS. 1-5 may be implemented with one or more computing devices. Turning to FIG. 6, a block diagram illustrating an example of a data processing system (e.g., a computing device) in accordance with an embodiment is shown. For example, system 600 may represent any of data processing systems described above performing any of the processes or methods described above. System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 605-608 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like. More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 601, which may be a low power multi-core processor socket such as an ultra-low voltage processor, may act as a main processing unit and central hub for communication with the various components of the system. Such processor can be implemented as a system on chip (SoC). Processor 601 is configured to execute instructions for performing the operations discussed herein. System 600 may further include a graphics interface that communicates with optional graphics subsystem 604, which may include a display controller, a graphics processor, and/or a display device.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 600 may further include IO devices such as devices (e.g., 605, 606, 607, 608) including network interface device(s) 605, optional input device(s) 606, and other optional IO device(s) 607. Network interface device(s) 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with a display device of optional graphics subsystem 604), a pointer device such as a stylus, and/or a keyboard (e.g., physical keyboard or a virtual keyboard displayed as part of a touch sensitive screen). For example, input device(s) 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 601, e.g., via a serial peripheral interface (SPI). This flash device may provide for non-volatile storage of system software, including a basic input/output software (BIOS) as well as other firmware of the system.

Storage device 608 may include computer-readable storage medium 609 (also known as a machine-readable storage medium or a computer-readable medium) on which is stored one or more sets of instructions or software (e.g., processing module, unit, and/or processing module/unit/logic 628) embodying any one or more of the methodologies or functions described herein. Processing module/unit/logic 628 may represent any of the components described above. Processing module/unit/logic 628 may also reside, completely or at least partially, within memory 603 and/or within processor 601 during execution thereof by system 600, memory 603 and processor 601 also constituting machine-accessible storage media. Processing module/unit/logic 628 may further be transmitted or received over a network via network interface device(s) 605.

Computer-readable storage medium 609 may also be used to store some software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 628, components and other features described herein can be implemented as discrete hardware components or integrated in the functionality of hardware components such as ASICS, FPGAs, DSPs or similar devices. In addition, processing module/unit/logic 628 can be implemented as firmware or functional circuitry within hardware devices. Further, processing module/unit/logic 628 can be implemented in any combination hardware devices and software components.

Note that while system 600 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments as described herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing a data processing system, comprising:
    making an identification that a service hosted at least in part by the data processing system is classified as an undefined service, the service being classified as the undefined service by a transition of the data processing system from a first state to a second state, and the second state being a desired operating state for the data processing system and the service being classified as the undefined service is not listed among services associated with the second state;
    based on the identification:
        making a determination regarding whether the data processing system is storing an undefine policy associated with the undefined service;
        in a first instance of the determination where the data processing system is storing the undefine policy associated with the undefined service:
            retrieving the undefine policy, the undefine policy specifying one or more actions that are barred from being executed on the undefined service by the data processing system; and
            using the undefine policy to perform a first action set to attempt to transition the data processing system to the desired operating state while preventing unintended actions from being executed on the undefined service, the first action set transitioning the data processing system to a third state; and
        in a second instance of the determination where the data processing system is not storing the undefine policy associated with the undefined service:
            performing a second action set to attempt to transition the data processing system to the desired operating state, the second action set transitioning the data processing system to a fourth state.

2. The method of claim 1, further comprising:
    in an instance where the third state is different from the desired operating state:
        issuing an error to notify a user of the data processing system that the data processing system is unable to enter the desired operating state.

3. The method of claim 2, wherein, in the desired operating state of the data processing system, the undefined service is not to be hosted by the data processing system.

4. The method of claim 3, wherein issuing the error comprises providing instructions for the user to revert the data processing system to the first state.

5. The method of claim 3, wherein the one or more actions that are barred from being executed on the undefined service specify at least one requirement from a group of requirements consisting of:
    an operating retention policy that defines allowable changes and/or unallowable changes in operation of the undefined service; and
    a data retention policy that defines allowable changes and/or unallowable changes in data of the undefined service.

6. The method of claim 5, wherein the unallowable changes in the operation of the undefined service comprise at least one of killing the undefined service, performing a graceful shutdown of the undefined service, and removing the undefined service from being hosted by the data processing system.

7. The method of claim 5, wherein the unallowable changes in the data of the undefined service comprise removing the data from storage of the data processing system.

8. The method of claim 1, further comprising:
    ingesting the second state into an automation engine to obtain a first set of actions;
    in the first instance of the determination where the undefined service is subject to the undefine policy:
        based on the one or more actions that are barred from being executed on the undefined service by the data processing system, identifying a portion of actions of the first set of actions that are barred for performance; and
        resolving the first set of actions based on the portion of the actions to obtain the first action set.

9. The method of claim 8, further comprising:
    in the second instance of the determination where the undefined service is not subject to any undefine policies:
        using the first set of actions as the second action set.

10. The method of claim 9, wherein the automation engine is adapted to identify actions to be performed to modify the first state to match the second state, the first state being a current state of the data processing system when the identification is made.

11. The method of claim 1, further comprising:
obtaining a declarative statement defining, at least in part, the second state; and
classifying the service as being the undefined service due to a change in operating state of the service in the second state when compared to an operating state of the service in the first state.

12. A non-transitory machine-readable medium having instructions stored therein, which when executed by at least one processor, cause a system to perform operations for managing a data processing system, the operations comprising:
making an identification that a service hosted at least in part by the data processing system is classified as an undefined service, the service being classified as the undefined service by a transition of the data processing system from a first state to a second state, and the second state being a desired operating state for the data processing system and the service being classified as the undefined service is not listed among services associated with the second state;
based on the identification:
making a determination regarding whether the data processing system is storing an undefine policy associated with the undefined service;
in a first instance of the determination where the data processing system is storing the undefine policy associated with the undefined service:
retrieving the undefine policy, the undefine policy specifying one or more actions that are barred from being executed on the undefined service by the data processing system; and
using the undefine policy to perform a first action set to attempt to transition the data processing system to the desired operating state while preventing unintended actions from being executed on the undefined service, the first action set transitioning the data processing system to a third state; and
in a second instance of the determination where the data processing system is not storing the undefine policy associated with the undefined service:
performing a second action set to attempt to transition the data processing system to the desired operating state, the second action set transitioning the data processing system to a fourth state.

13. The non-transitory machine-readable medium of claim 12, wherein the operations further comprise:
in an instance where the third state is different from the desired operating state:
issuing an error to notify a user of the data processing system that the data processing system is unable to enter the desired operating state.

14. The non-transitory machine-readable medium of claim 13, wherein, in the desired operating state of the data processing system, the undefined service is not to be hosted by the data processing system.

15. The non-transitory machine-readable medium of claim 14,
wherein issuing the error comprises providing instructions for the user to revert the data processing system to the first state, and
wherein the one or more actions that are barred from being executed on the undefined service specify at least one requirement from a group of requirements consisting of:
an operating retention policy that defines allowable changes and/or unallowable changes in operation of the undefined service; and
a data retention policy that defines allowable changes and/or unallowable changes in data of the undefined service.

16. A system, comprising:
at least one processor; and
a memory coupled to the processor to store instructions, which when executed by the at least one processor, cause the system to perform operations for managing a data processing system, the operations comprising:
making an identification that a service hosted at least in part by the data processing system is classified as an undefined service, the service being classified as the undefined service by a transition of the data processing system from a first state to a second state, and the second state being a desired operating state for the data processing system and the service being classified as the undefined service is not listed among services associated with the second state;
based on the identification:
making a determination regarding whether the data processing system is storing an undefine policy associated with the undefined service;
in a first instance of the determination where the data processing system is storing the undefine policy associated with the undefined service:
retrieving the undefine policy, the undefine policy specifying one or more actions that are barred from being executed on the undefined service by the data processing system; and
using the undefine policy to perform a first action set to attempt to transition the data processing system to the desired operating state while preventing unintended actions from being executed on the undefined service, the first action set transitioning the data processing system to a third state; and
in a second instance of the determination where the data processing system is not storing the undefine policy associated with the undefined service:
performing a second action set to attempt to transition the data processing system to the desired operating state, the second action set transitioning the data processing system to a fourth state.

17. The system of claim 16, wherein the operations further comprise:
in an instance where the third state is different from the desired operating state:
issuing an error to notify a user of the data processing system that the data processing system is unable to enter the desired operating state.

18. The system of claim 17, wherein, in the desired operating state of the data processing system, the undefined service is not to be hosted by the data processing system.

19. The system of claim 18, wherein issuing the error comprises providing instructions for the user to revert the data processing system to the first state.

20. The system of claim 18, wherein the one or more actions that are barred from being executed on the undefined service specify at least one requirement from a group of requirements consisting of:
an operating retention policy that defines allowable changes and/or unallowable changes in operation of the undefined service; and a data retention policy that defines allowable changes and/or unallowable changes in data of the undefined service.

\* \* \* \* \*